Sept. 11, 1951　　　　　L. F. STONE　　　　　2,567,657
TWO AXLE DRIVING MECHANISM FOR MOTOR VEHICLES
AND MOUNTING THEREFOR
Filed March 24, 1947　　　　　　　　　　　3 Sheets-Sheet 1
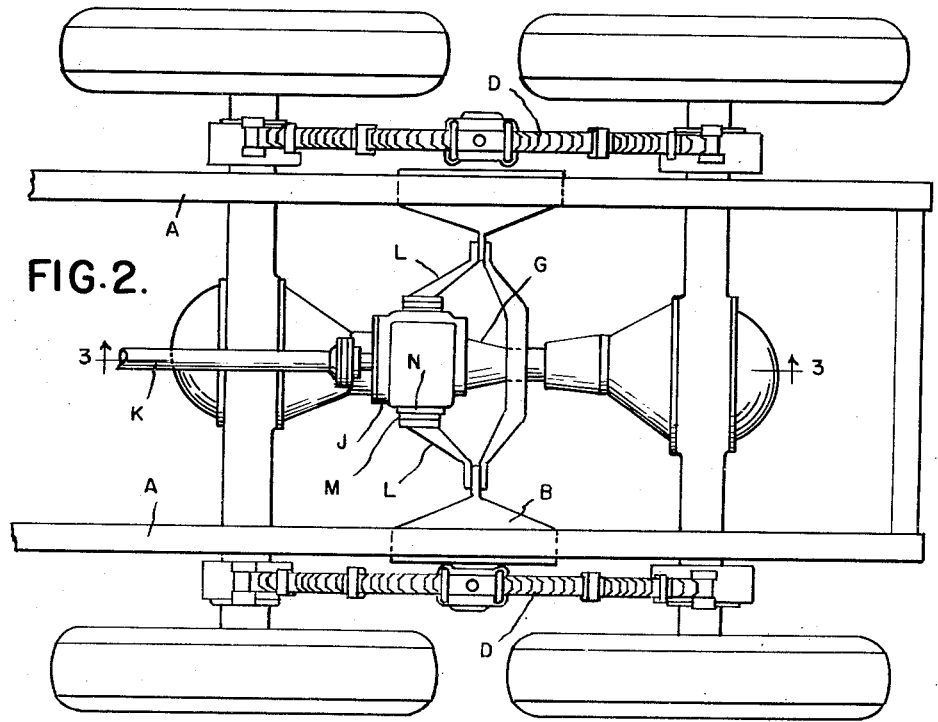
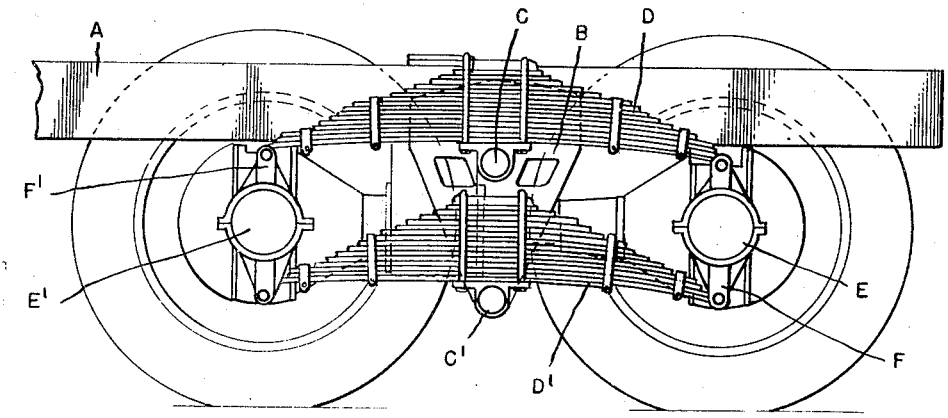
INVENTOR.
LEO F. STONE
BY
Whittemore Hulbert & Belknap
ATTORNEYS Sept. 11, 1951  L. F. STONE  2,567,657
TWO AXLE DRIVING MECHANISM FOR MOTOR VEHICLES
AND MOUNTING THEREFOR
Filed March 24, 1947  3 Sheets-Sheet 3

INVENTOR.
LEO F. STONE
BY
ATTORNEYS

Patented Sept. 11, 1951

2,567,657

UNITED STATES PATENT OFFICE 2,567,657

TWO AXLE DRIVING MECHANISM FOR MOTOR VEHICLES AND MOUNTING THEREFOR

Leo F. Stone, Detroit, Mich., assignor to The Grico Two Axle Drive Company, Detroit, Mich., a corporation of Michigan Application March 24, 1947, Serial No. 736,660

4 Claims. (Cl. 180—22)

The invention relates to driving mechanisms for motor vehicles in which driving torque is transmitted to a plurality of drive axles independently movable with respect to a spring supported frame. More particularly, the invention relates to that type comprising a pair of axles connected to the opposite ends of a spring or a plurality of springs centrally pivoted to the frame.

It is an object of the invention to obtain a construction of driving mechanism through which torque is transmitted to each of the axles without restraint to the independent movement thereof due to road conditions.

It is a further object to avoid cramping of any portion of the driving mechanism during such independent movement of the axles. With these objects in view, the invention consists in the construction as hereinafter set forth.

In the drawings:

Fig. 1 is a side elevation of a portion of the vehicle frame having a two-axle drive mechanism of my improved construction;

Fig. 2 is a plan view thereof;

As illustrated the vehicle frame comprises a pair of side sills A of channel cross-section. Secured to these sills and depending therefrom are bracket members B each of which has secured thereto a pair of superposed trunnions C and C'. D and D' are springs pivotally mounted on the trunnions C and C'. E and E' are driving axles connected, respectively, to the opposite ends of the springs D and D' by link members F and F'. Each of the driving axles E and E' is of usual construction and therefore will not be described in detail. However, the two axles are centrally connected to each other by a longitudinally extending housing G inclosing a shaft H and aligned shafts H' and H², respectively, connected to the differential gearings I of the axles. Splined members H⁴ transmit torque from the shaft H to the shafts H' and H² while permitting independent axial movement of the latter.

The housing G is formed of telescopically engaged sections G', G² and G³ which permit a relative axial movement thereof to compensate for relative movements of the axles. Beyond the section G² is mounted a housing J for a variable speed transmission gearing, which will not be described in detail, but which is intermediate a propeller drive shaft K and the shaft H. The housing J is held from axial movement with respect to the housing section G' by a coupling member J' which, however, permits of independent rotation of these members. The sections G² and G³ are independently movable both axially and rotatably. Thus, with the construction as thus far described it will be apparent that the transmission housing J will float with the axles but that there is nothing to absorb torque reaction stresses when the mechanism is in operation.

To take care of these torque reaction stresses without interference with the free independent movement of the axles and without any cramping of the driving mechanism, I have devised the following construction.

Figure 3:
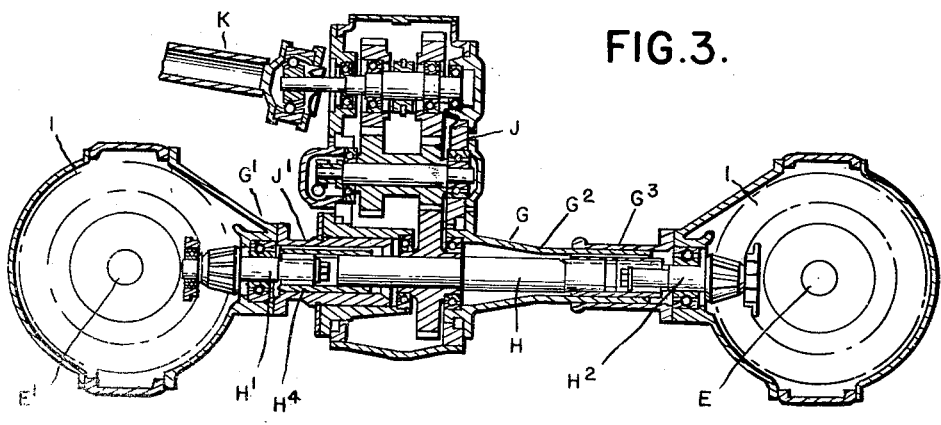
Fig. 3 is a vertical longitudinal section on line 3—3, Fig. 2.
Figure 4:
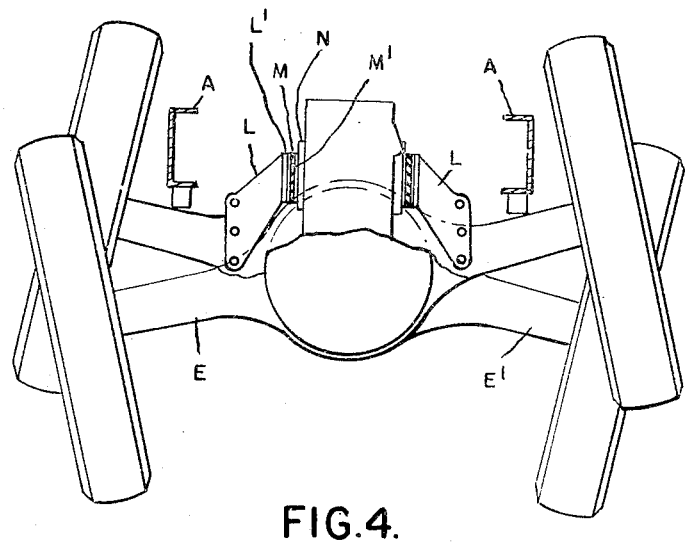
Fig. 4 is an end elevation partly in transverse section illustrating the independent angular movements of the two axles.
Figure 5:
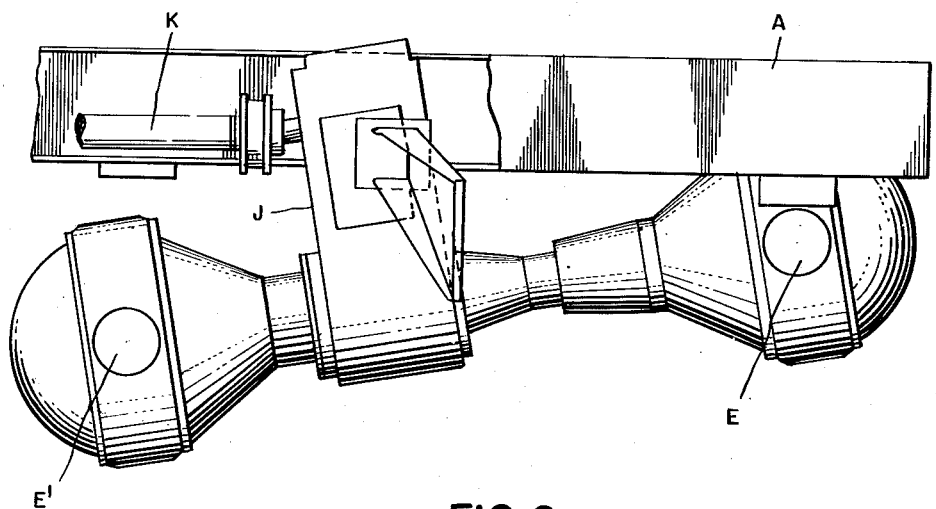
Figs. 5 and 6 are diagrammatic side elevations illustrating different movements of the axles.
Figure 6:
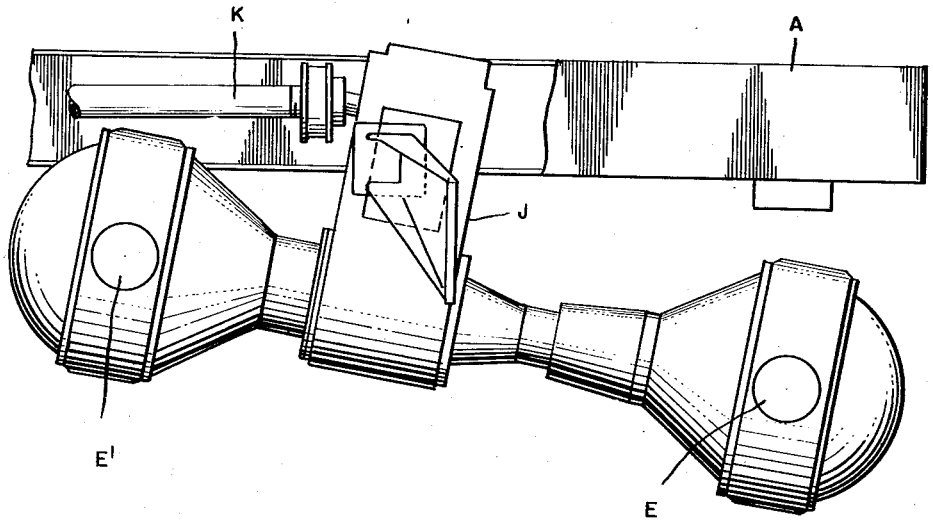

L are arms rigidly mounted on the frame, preferably by being attached to the bracket members B and extending therefrom into proximity to the opposite sides of the housing J. These arms terminate in plates L' which are parallel to the sides of the housing J and have mounted thereon resilient pads M preferably formed of rubber but having metallic facings M'. The housing J is provided on opposite sides with plates N which are parallel to each other and to the pads M. Thus, any torque reaction of the driving mechanism which might tend to rotate the housing J about either the axis of the propeller shaft K, or that of the shaft H, will be transmitted from the plates N to the resilient pads M. This, however, will not prevent free floating movement of the housing J with respect to the frame in a vertical longitudinal plane. The construction is also one which will permit free independent angular movement of the axles with respect to the axis of the shaft H, as illustrated in Fig. 4, and also independent vertical movement of said axles as illustrated in Figs. 5 and 6.

What I claim as my invention is:

1. The combination with a vehicle frame of a pair of driving axles connected to each other and to said frame to be independently vertically movable in relation to the latter, a common driving connection to said axles mounted to float therewith and with respect to said frame and including a transmission gearing, and means rigidly connected to and rigid with said frame for confining the movement of said transmission gearing to a vertical longitudinal plane and absorbing torque reactions of said driving connection without interfering with the floating movement thereof.

2. The combination with a vehicle frame of a pair of driving axles connected to each other and to said frame to be independently vertically movable in relation to the latter, a shaft extending between said axles and having a driving connection with each, a housing for said shaft, a driving connection to said shaft including a transmission gearing, a housing for said transmission gearing mounted on said shaft housing to float therewith and to be angularly movable about the axis thereof, and means mounted on said frame having portions located on opposite sides of said transmission housing in vertical sliding contact therewith adapted to confine the floating movements of the latter to a vertical longitudinal plane and to absorb torque reactions of said driving connection.

3. The combination with a vehicle frame, trunnion mounted springs on opposite sides thereof and a pair of axles mounted on the free ends of said springs, of a driving connection to said axles including a shaft extending therebetween, a variable speed transmission mechanism connected to said shaft, and a propeller shaft connected to said transmission, the latter and one end of said propeller shaft being mounted to float with said axles, a housing for said transmission mechanism having parallel opposite side faces extending longitudinally of said frame, brackets on said frame having portions located on opposite sides of said housing, and pads on said brackets for engaging said parallel side faces to confine the floating movement of the latter to a vertical longitudinal plane and to absorb torque reactions of said driving connection.

4. The combination with a vehicle frame, centrally trunnion mounted springs on opposite sides of said frame and a pair of driving axles connected respectively to the opposite free ends of said springs, of a housing connecting the two axles centrally of said frame and formed of telescopic sections permitting a limited relative movement of said axles toward and from each other; a casing rigidly mounted on the central portion of said housing to extend upward therefrom, a driving train for each of said axles including a propeller shaft universally pivotally connected to the upper portion of said casing, a variable speed transmission mechanism within said casing and aligned shafts in said housing for connecting the driven member of said transmission to the respective axles and resilient pads mounted on said frame and bearing against opposite sides of said casing to absorb torque reactions of the latter while permitting freedom of movement in a vertical longitudinal plane therebetween.

LEO F. STONE.

REFERENCES CITED

The following references are of record in the file of this patent:

UNITED STATES PATENTS

| Number | Name | Date |
| --- | --- | --- |
| 1,607,919 | Saives | Nov. 23, 1926 |
| 2,043,725 | Anderson | June 9, 1936 |
| 2,047,088 | Thornton | July 7, 1936 |
| 2,099,703 | Paton | Nov. 23, 1937 |
| 2,206,752 | Price | July 2, 1940 |
| 2,339,539 | Zeilman | Jan. 18, 1944 |
| 2,356,180 | Roos | Aug. 22, 1944 |

FOREIGN PATENTS

| Number | Country | Date |
| --- | --- | --- |
| 305,340 | Great Britain | Feb. 7, 1929 |
| 493,536 | Germany | Mar. 8, 1930 |